Figure 1:
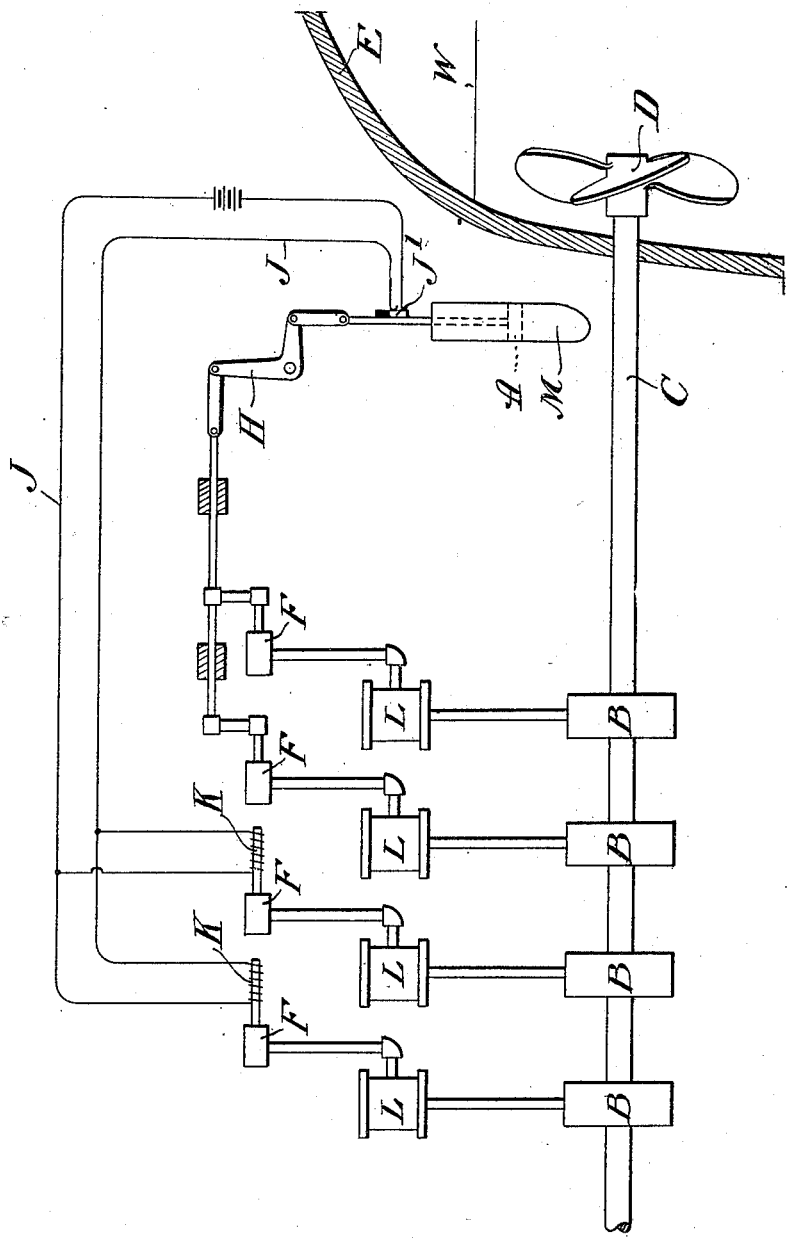

No. 697,053. Patented Apr. 8, 1902.
G. WHITTLESEY.
BRAKE FOR PROPELLER SHAFTS.
(Application filed Dec. 19, 1900. Renewed Jan. 28, 1902.)
(No Model.)
2 Sheets—Sheet 1.

WITNESSES:
W. Hackley.
W. S. Allyn.

INVENTOR
George Whittlesey.
BY
R. Cunechee
ATTORNEY

No. 697,053. Patented Apr. 8, 1902.
G. WHITTLESEY.
BRAKE FOR PROPELLER SHAFTS.
(Application filed Dec. 19, 1900. Renewed Jan. 28, 1902.)
(No Model.) 2 Sheets—Sheet 2.
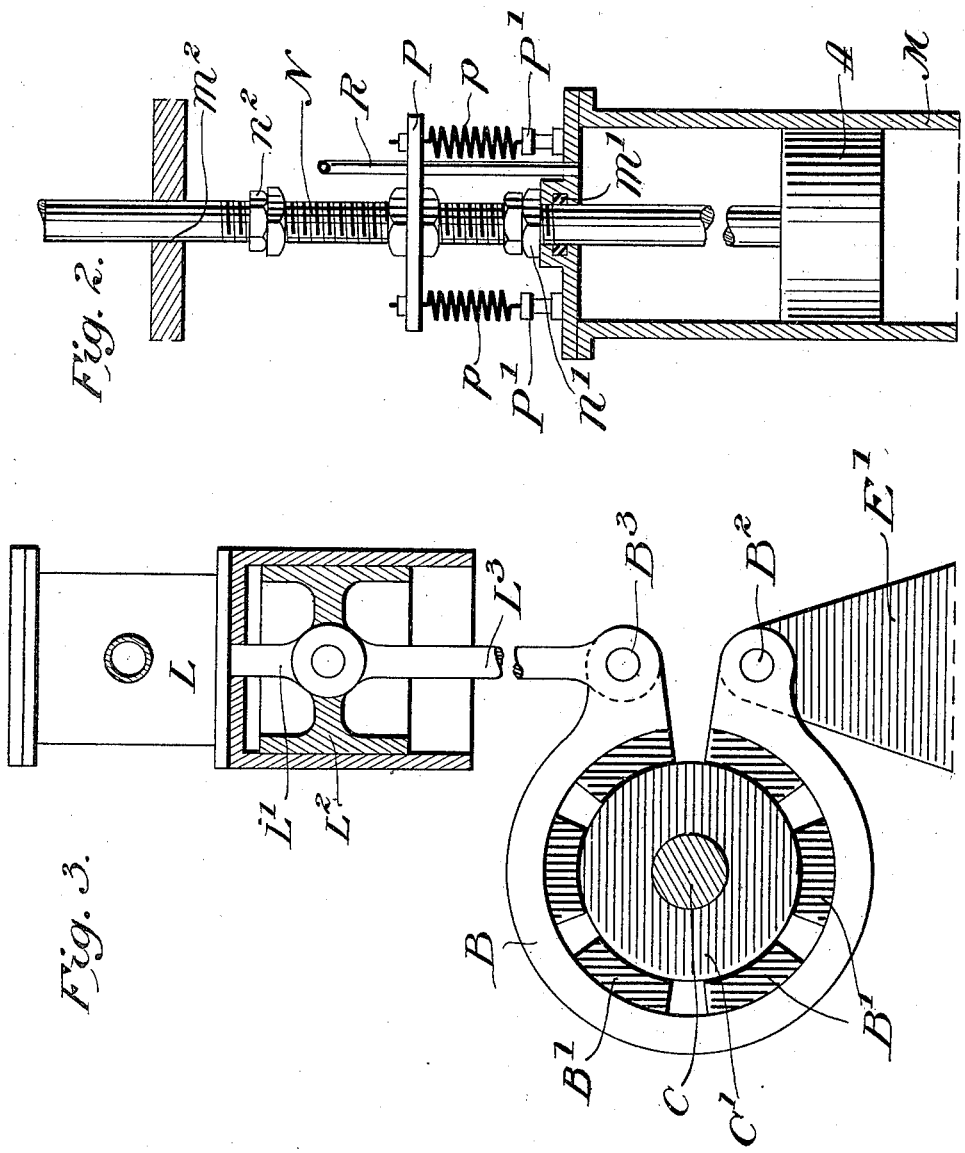
WITNESSES:
INVENTOR
George Whittlesey.
BY
ATTORNEY

UNITED STATES PATENT OFFICE.

GEORGE WHITTLESEY, OF NEW LONDON, CONNECTICUT.

BRAKE FOR PROPELLER-SHAFTS.

SPECIFICATION forming part of Letters Patent No. 697,053, dated April 8, 1902.

Application filed December 19, 1900. Renewed January 28, 1902. Serial No. 91,648. (No model.)

*To all whom it may concern:*

Be it known that I, GEORGE WHITTLESEY, a citizen of the United States, residing at New London, New London county, Connecticut, have invented certain new and useful Improvements in Governors for Marine Engines, of which the following is a full, clear, and exact description.

My invention relates to safety appliances for power-driven vessels, and particularly to means for preventing the racing of marine engines and the parts attached thereto.

The object of my invention is to establish in a power-driven vessel a system of mechanisms whereby the action of the engine and the propeller may be controlled and made more uniform under the varying conditions of the sea in order that many of the discomforts and dangers arising from the present inadequate control of the engine and moving parts of the propelling mechanism may be avoided. For this purpose a float or diaphragm operable by the variations in pressure occurring at the side or stern of a vessel in the locality of the propeller, in conjunction with the motion of the vessel itself, is provided, which may by its action control means for applying a substitutionary resistance to the turning moment of the engines, as will be hereinafter described.

In the drawings, Figure 1 represents a diagrammatic view of mechanism located within a vessel, illustrating and embodying my invention. Fig. 2 is a projection, partly in section, of a float adapted to control the operating mechanism. Fig. 3 is a projection, partly in section, of a power-brake, a convenient method of applying the compensating or substituted resistance.

In Fig. 1, A is a power-buoy—a piston or float situated near the point of application of the propelling power of the vessel. B B are brakes, controlled as hereinafter shown, adapted to act in connection with the main driving-shaft C, through which shaft the power of the engine is applied for the propulsion of the vessel. The propeller is shown in the drawings as situated near the stern of the vessel, of which E is a section of the stern post or skag. F F F F are steam-valves controlled by the float A in a convenient manner mechanically by the system of levers H or electrically from the connections J. K K are solenoids or sucking-magnets controlling by well-known methods soft-iron cores which may operate the valves F F. J' is a sliding electrical contact or switch operated by the rod on the float A, as this float A varies its position. The valves F are situated conveniently in connection with the steam-cylinders L, which contain the pistons adapted by means of steam-pressure to apply power to the brakes B B, and thereby resist unbalanced turning moments of the engines. The precise method of application of the electrical power and of the method of operation of the valve-gear are constructive details which it is not necessary to describe here. The float A is placed within a tube or cylinder which is in communication with the water, preferably at a point near the propeller, in order that the pressure upon this float may vary and be in accordance as near as may be with the pressure to which the propeller itself is subjected in actual practice. It is desirable that the outer opening of this tube M should be somewhat protected against the entrance of foreign elements by means of some suitable form of grating. Obviously the point at which this tube is placed in communication with the water will be different under the various conditions under which the apparatus will be called upon to work—as, for instance, the application to a vessel having twin or triple shafts or one in which the stern is very much cut away. In some cases in which the lines are uncommon and the propeller itself is even set out at the end of a long tail-shaft, there being no part of the vessel sufficiently convenient through which the opening in connection with the tube M might be made, it may be found necessary to place the float A in a tube independent of the vessel, or rather projecting from the under side of the same in the vicinity of the propeller.

In Fig. 2, A is the float, situated within the tube or cylinder M and controlling the electrical connections and the rod-operating mechanisms by means of the sliding rod N, which has suitable guides in the packing-box at $m'$ in the head of the cylinder M and conveniently at $m^2$, which may be independent of the tube M, but stationary in respect thereto. A change in the pressure of the water which is in communication with the float A operates to give the float a movement upward or downward, which for constructive reasons should be confined within suitable limits. This is done by means of the check-nuts $n'$ $n^2$, securely fastened to the rod N, and yet adapted to be adjustable thereon, which stops may be cushioned, if desired. In practice the pitching and rolling of a vessel at sea and in a storm are sometimes so great that the blades of the propeller are brought out of water either by the raising of the stern or by the falling away of a wave beneath the same. These variations in pressure occurring in the vicinity of the opening of the tube M cause movements of the float A which, if uncontrolled, might be of a violent and uncertain nature. For its proper control I have secured to the rod N of the float an arm or disk P, to which are connected tension-springs $p$. These springs are adjustable at their point of connection with the arm P and are suitably secured at the points P' on the head of the cylinder M. The float A thus being supported or sustained by the dynamic force of the pressure of the water underneath rises and falls as this pressure varies, the springs in conjunction with the weight of the float A, rod N, and parts tending to balance the same and cause the piston to be sensitive to these changes of pressure. In view of the fact that a vessel may proceed at various times under different conditions of load, it is advisable that the position of the float within the tube may be adjustable. This may be accomplished by having an extensible joint in the rod N. For finer adjustments the tension of the springs $p$ may be varied by changing the position of the arm P upon the rod N. This float A is provided with suitable packing devices within the cylinder M. To prevent the occurrence of a vacuum and to make the pressure upon the top of the float A more uniform, I have provided a vent R, which affords air communication with the upper part of the cylinder M.

In Fig. 3, C shows the cross-section of the main propeller-shaft, having fixed upon it a disk or pulley C', to which may be applied a brake B. B' B' are brake-shoes secured to the rim of the brake B in a suitable manner and adapted to withstand the wear to which the brake is subjected in practice. In certain cases it may be found advisable to use cooling devices in conjunction with these brake-shoes, which may be then constructed in such a manner as to contain tubes for cooling-water. E' is a suitable support, which provides what may be termed a "fulcrum" $B^2$ for the brake B. Power is applied at a connection-point $B^3$ on the brake B from the steam-cylinder L by means of the ordinary piston-rod L', cross-head $L^2$, and connecting-rod $L^3$. This brake, surrounding the pulley or wheel C' on the shaft C, provides a means of applying suitable resistance to the turning moment of the engine, and its degree will depend, obviously, upon the diameter of the steam-cylinder L, upon the steam-pressure in connection therewith, upon the diameter of the brake, upon its width, and upon various other conditions, as well as upon the duration of application of the brake. A plurality of brakes may be employed according to circumstances, and the method of controlling their valves may be divided as desired between the mechanical and the electrical devices. The power to be applied by means of these brakes may be varied to suit conditions by adjusting the length of stroke of the steam-piston in the cylinder L, by setting the valve F properly, or by other suitable means.

The term "float" as used in the claims is intended to include a float as shown or any other mechanical equivalent.

When resistance to the rotation of a propeller is decreased by reason of a lessening of the water-pressure against which it acts, a continued force of steam-pressure at the engine tends to raise its speed abnormally and to set up vibrations within the vessel of an exceedingly dangerous nature. With a steam-governor it is not practical to cut off the admission of steam entirely, and hence there is a force, which may be very large at times, being applied to the piston of the engine, which is used almost entirely in giving momentum to the moving parts of the machinery. By my invention it is possible to prevent this racing by providing that the water-pressure, tending by its decrease to cause it, may set in operation forces which shall act vicariously. These forces might be so disposed as to perform a useful work, and this adaptation may be made the subject of another application.

It is not my intention by this invention to do away with the use of the ordinary method of governing marine engines, but to use this system in conjunction with some form of efficient marine-engine governor. The causes of vibrations of steamships are various and may be traced to many different conditions; but in my invention I have only attempted to provide a means for preventing vibrations caused by the excessive speed of unbalanced rotation of the engine and the parts connected therewith.

What I claim is—

1. In a device for preventing racing of marine engines, a float subjected to variation in water-pressure near the propeller, valves controlled by said float governing means for applying a resistance to the rotation of the propeller.

2. In a device for preventing racing of marine engines, a float subjected to variation in water-pressure near the propeller, means electrically controlled by said float for applying a power resistance to the rotation of the propeller when the normal resistance is decreased.

3. In a device for preventing racing of marine engines, a float operable by variations in pressure near the propeller for controlling the application of resistance to the rotation of the propeller, which resistance shall be independent of the power of the float.

4. In a device for preventing racing of marine engines, a float operable by variations in pressure near the propeller for controlling the application of an adjustable resistance to the rotation of the propeller when the normal resistance is decreased.

5. In a device for preventing racing of marine engines, a float adjustable in sensitiveness operable by variations in water-pressure near the propeller for controlling the application of resistance to the rotation of the propeller.

6. In a device for preventing racing of marine engines, an adjustable float operable by variations in water-pressure near the propeller for electrically controlling the application of resistance to the rotation of the propeller.

7. In a device for preventing racing of marine engines, a float adjustable in position and operable by variation in the water-pressure and by springs, means controllable by the action of said float for applying resistance to the rotation of the engine-shaft, when the resistance is decreased.

8. A governor for a marine engine comprising a brake mechanism for the propeller-shaft said brake being actuated by a fluid-pressure said pressure being in turn governed by a float, the fluid-pressure being independent of the power of the float.

9. In a device for preventing racing of marine engines, a float sustained by the pressure of water beneath it, said float controlling by an electrically-operated valve when said pressure is decreased the application of a power-brake to prevent undue increase in speed of the engine.

10. A governor for marine engines comprising a propelling means, a float, means for applying resistance to the said propelling means which may be independent of the power of said float said resistance being controlled by said float.

Signed at New London, Connecticut, this 17th day of December, 1900.

GEORGE WHITTLESEY.

Witnesses:
ROBERT R. CONGDON, Jr.,
CHARLES E. WHITE.